US008320063B2

(12) United States Patent
Shibatani

(10) Patent No.: US 8,320,063 B2
(45) Date of Patent: Nov. 27, 2012

(54) ACTUATOR AND OPTICAL DEVICE

(75) Inventor: Kazuhiro Shibatani, Sakai (JP)

(73) Assignee: Konica Minolta Opto, Inc., Tokyo (JP)

( * ) Notice: Subject to any disclaimer, the term of this patent is extended or adjusted under 35 U.S.C. 154(b) by 106 days.

(21) Appl. No.: 12/763,502

(22) Filed: Apr. 20, 2010

(65) Prior Publication Data
US 2010/0271715 A1 Oct. 28, 2010

(30) Foreign Application Priority Data

Apr. 22, 2009 (JP) ................. 2009-103901

(51) Int. Cl.
*G02B 7/02* (2006.01)
*G02B 23/00* (2006.01)
(52) U.S. Cl. ........ 359/822; 359/813; 359/824; 359/399; 359/429; 310/323.01; 310/323.02; 396/133
(58) Field of Classification Search .................. 359/813, 359/814, 824, 235; 310/323.02; 250/203.6, 250/203.7, 235, 236, 589; 342/59, 146, 176, 342/178; 388/819; 356/369, 614; 385/52, 385/147; 600/101, 463
See application file for complete search history.

(56) References Cited

U.S. PATENT DOCUMENTS

| | | | | |
|---|---|---|---|---|
| 4,375,818 A | * | 3/1983 | Suwaki et al. ................. | 600/463 |
| 4,803,409 A | * | 2/1989 | Horikawa ..................... | 388/819 |
| 7,301,698 B2 | * | 11/2007 | Chen et al. .................... | 359/399 |
| 7,348,693 B2 | * | 3/2008 | Sasaki et al. ............. | 310/323.02 |
| 7,365,480 B2 | * | 4/2008 | Honda et al. ................... | 313/143 |
| 7,449,802 B2 | * | 11/2008 | Sasaki et al. ............. | 310/323.02 |
| 7,603,010 B2 | * | 10/2009 | Kwan et al. ..................... | 385/52 |
| 2009/0310145 A1 | * | 12/2009 | Sugiyama et al. ............ | 356/614 |
| 2010/0277039 A1 | * | 11/2010 | Shibatani et al. ........ | 310/323.02 |

FOREIGN PATENT DOCUMENTS

| | | |
|---|---|---|
| JP | 2003-338795 A | 11/2003 |
| JP | 2005-222049 A | 8/2005 |
| JP | 2008-026609 A | 2/2008 |
| JP | 2008-046467 A | 2/2008 |

* cited by examiner

*Primary Examiner* — Loha Ben
(74) *Attorney, Agent, or Firm* — Brinks Hofer Gilson & Lione

(57) ABSTRACT

An actuator capable of attaining two-dimensional positioning with a simple configuration includes an electromechanical transducer 11 which makes mechanical displacement in accordance with a voltage applied thereto, a driving shaft 12 which is axially displaced and inclined by the mechanical displacement of the electromechanical transducer 11, a movable member 13 which frictionally engages on the driving shaft 12, and a driving circuit for superposing a direct-current driving voltage leading to an inclination of the driving shaft 12 at a desired angle at a low rate of change preventing slide displacement of the movable member 13 relative to the driving shaft 12 and an alternating driving voltage for causing axial vibrations of the driving shaft 12 so as to cause slide displacement of the movable member 13 relative to the driving shaft 12 and applying the superposed voltages to the electromechanical transducer 11.

8 Claims, 5 Drawing Sheets

ACTUATOR AND OPTICAL DEVICE

This application is based on application No. 2009-103901 filed in Japan, the contents of which are hereby incorporated by reference.

TECHNICAL FIELD

The present invention relates to an actuator in a polar coordinate system and an optical device for positioning of an optical member.

BACKGROUND ART

In JP 2005-222049 A, JP 2003-338795 A, JP 2008-026609 A and JP 2008-046467 A are disclosed devices for aligning an optical member such as a lens. In any of the devices, quantities of decentering of the optical member in directions of axes in a Cartesian coordinate system are detected and a position of the optical member is corrected in the directions of X-axis and Y-axis by respective linear actuators.

In JP 2003-338795 A, JP 2008-026609 A and JP 2008-046467 A are disclosed estimation of the quantities of decentering in the directions of the axes by wobbling in which change in power of a laser beam is detected with forward and backward displacement of the lens by a specified minute quantity, and alignment of the lens.

In JP 2008-026609 A and JP 2008-046467 A is disclosed positioning of the lens in X-Y directions by friction drive type actuators which cause a piezoelectric element to oscillate a driving shaft and which cause slide displacement of a movable member frictionally engaging on the driving shaft.

SUMMARY OF INVENTION

The positioning systems for the Cartesian coordinate system require a plurality of actuators for the two-dimensional positioning. In the devices using the friction drive type actuators, drive of one actuator may cause activation of other actuators, provided that drive frequencies of the actuators are close to one another.

In view of the above problems, an object of the present invention is to provide an actuator capable of achieving two-dimensional positioning with a simple configuration, and an optical device capable of achieving positioning of an optical member with a simple configuration.

In order to achieve the above object of present invention, there is provided an actuator including an electromechanical transducer which makes mechanical displacement in accordance with a voltage applied thereto, a driving shaft which is axially displaced and inclined by the mechanical displacement of the electromechanical transducer, a movable member which frictionally engages on the driving shaft, and a driving circuit for superposing an alternating driving voltage for causing axial vibrations of the driving shaft so as to cause slide displacement of the movable member relative to the driving shaft and a direct-current driving voltage variable to a voltage leading to an inclination of the driving shaft at a desired angle, at a low rate of change preventing the slide displacement of the movable member relative to the driving shaft, and applying the superposed voltages to the electromechanical transducer.

According to this configuration, a position of the movable member on the driving shaft corresponding to a moving radius in a polar coordinate system is determined by the alternating driving voltage, and the angle of inclination of the driving shaft corresponding to an argument (azimuth angle) in the polar coordinate system is determined by the direct-current driving voltage. Thus the movable member can be located in a desired position on the polar coordinates.

In the actuator of the invention, the electromechanical transducer may be a piezoelectric element, and dimensional displacement of the piezoelectric element may partially be restrained by further provision of a restraint member or bonding of a part of a side surface of the piezoelectric element.

According to this configuration, the partial restraint of expansion and contraction of the piezoelectric element results in asymmetrical expansion and contraction of the piezoelectric element, so that the driving shaft can be inclined while being displaced in the axial direction in accordance with a quantity of the expansion and contraction of the piezoelectric element.

In the optical device according to the invention, the optical member is positioned by any of the actuators with respect to an argument and a moving radius of the polar coordinate system.

According to this configuration, since the two-dimensional positioning of the optical member can be attained by one actuator, the configuration can be simplified.

The optical device of the invention may further include monitor of which output decreases in accordance with the quantities of decentering of the optical member, and controller for controlling drive for the actuator so as to maximize the output of the monitor on basis of change in the output of the monitor caused by wobbling in which the moving radius and argument of the actuator are alternately driven forward and backward by only a minute quantity, and a time period for the wobbling for the moving radius may be equal to a time period for the wobbling for the argument.

According to this configuration, a process for calculating a quantity of positional deviation of the optical member based on the output of the monitor can be made common to the wobbling for the moving radius and the wobbling for the argument.

In the optical devices according to the invention, the optical member is positioned by the one actuator capable of altering the moving radius and argument in the polar coordinate system.

According to this configuration, absence of necessity for control over a plurality of actuators simplifies a circuit configuration thereof and prevents occurrence of problems such as cross talk between the actuators.

According to the invention, the argument in the polar coordinate system of the movable member engaged frictionally with the driving shaft can be determined by the angle of inclination of the driving shaft determined by the direct-current driving voltage, and the moving radius in the polar coordinate system of the movable member can be varied by the slide movement of the movable member with the axial vibrations of the driving shaft caused by the alternating driving voltage. Thus the two-dimensional positioning can be attained by the one actuator. There is no interference between the drive for the argument and the drive for the moving radius because the direct-current driving voltage and the alternating driving voltage greatly differ in frequency band.

BRIEF DESCRIPTION OF DRAWINGS

These and other objects and features of the present invention will become apparent from the following description taken in conjunction with the preferred embodiments thereof with reference to the accompanying drawings, in which.

DESCRIPTION OF EMBODIMENTS

Figure 1:
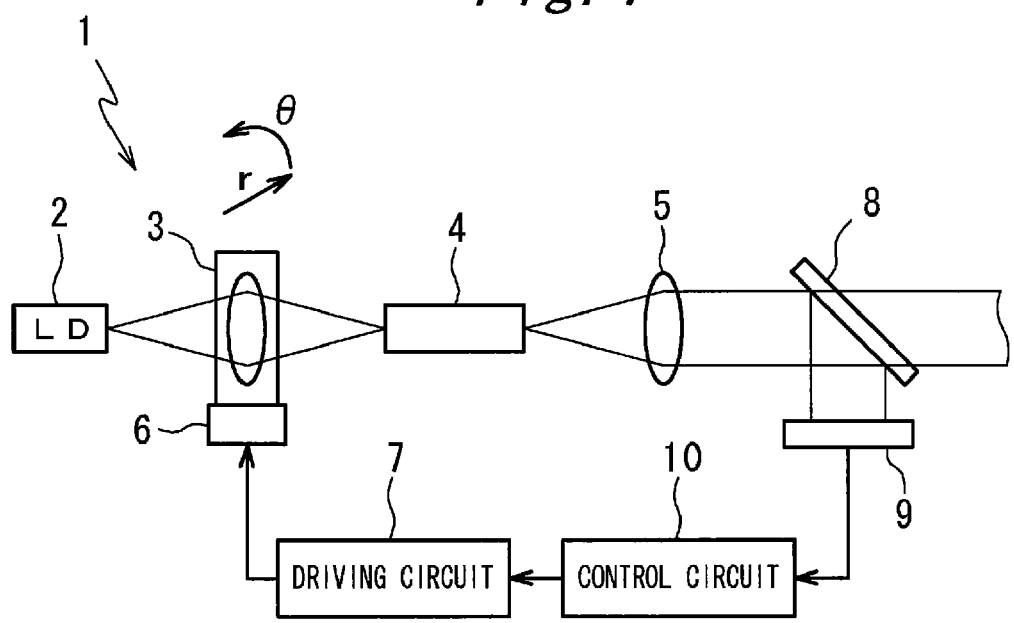
FIG. 1 is a schematic configuration of an optical device of a first embodiment of the invention.

FIG. 1 shows a configuration of a laser module 1 as an optical device of a first embodiment of the invention. The laser module 1 has a laser diode 2 for generating an infrared laser beam, a movable alignment lens 3 for guiding the laser beam, a second harmonic generator 4 as a light receiving member for receiving the laser beam and producing a green laser beam with half-wave length of the infrared laser beam, and an emission lens 5 for emitting output of the second harmonic generator 4. The alignment lens 3 undergoes positioning that is performed by an actuator 6 in a plane orthogonal to an optical axis of the laser beam. The actuator 6 is driven by a driving voltage applied from a driving circuit 7.

The laser module 1 further has a beam splitter 8 for splitting the output beam from the second harmonic generator 4, a power monitor 9 composed of a sensor such as photodiode for converting an output level of the split output beam from the second harmonic generator 4 into a voltage signal, and a control circuit (controller) 10 for controlling operation of the driving circuit 7 in response to output of the power monitor 9.

A light receiving part of the second harmonic generator 4 has an aperture on the order of 1 to 3 μm. The alignment lens 3 focuses the laser beam so that the laser beam has a diameter on the same order as the aperture of the light receiving part of the second harmonic generator 4 and aligns an optical axis of the laser beam with a center of the light receiving part of the second harmonic generator 4. When the optical axis of the laser beam is aligned with the center of the second harmonic generator 4, all energy of the laser beam is inputted into the second harmonic generator 4, so that outputs of the second harmonic generator 4 and outputs of the power monitor 9 are maximized.

Figure 2:
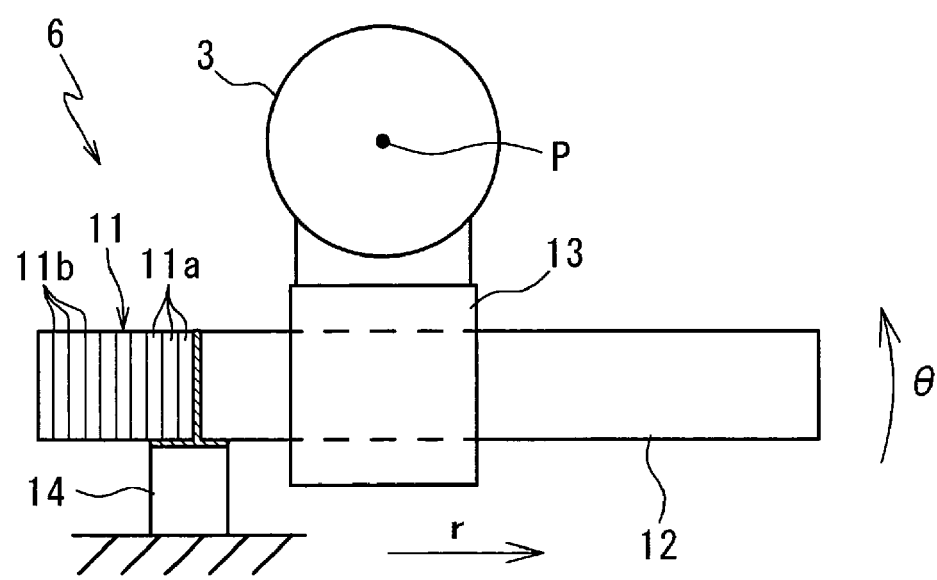
FIG. 2 is a configuration of an actuator of FIG. 1.

FIG. 2 shows a configuration of the actuator 6 for moving the alignment lens 3. The actuator 6 has a piezoelectric element (electromechanical transducer) 11 which is formed of alternately laminated expandable layers 11a and electrode layers 11b, and which expands and contracts in a direction of the lamination in accordance with the applied voltage, a driving shaft 12 which has one end fixed to the piezoelectric element and which extends in the direction of the lamination of the piezoelectric element, a movable member 13 which frictionally engages on the driving shaft 12 and which holds the alignment lens 3, a restraint member 14 which is bonded and fixed to underside of an outer circumference of a joint part between the piezoelectric element 11 and the driving shaft 12, which supports the piezoelectric element 11 and the driving shaft 12, and which partially restrains the bonded underside of the piezoelectric element 11 so as to interfere with change in a dimension thereof. The alignment lens 3 is supported on top of the movable member 13, and an optical center P of the alignment lens 3 is held with a deviation from centers of cross-sections of the piezoelectric element 11 and the driving shaft 12.

Figure 3:
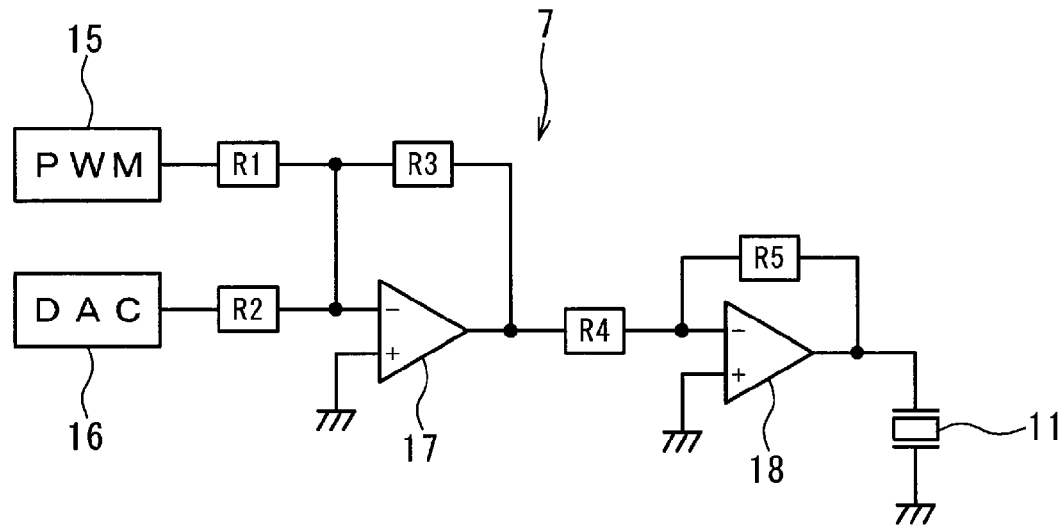
FIG. 3 is a circuit diagram of a driving circuit of FIG. 1.

FIG. 3 shows a configuration of the driving circuit 7. The driving circuit 7 comprises a pulse width modulator 15 for producing an alternating driving voltage composed of rectangular waves with a voltage of 3V and a duty ratio of 0.3 or 0.7 in accordance with control signals from the control circuit 10, a DA converter 16 for producing a direct-current driving voltage resulting from conversion from the digital signal of the control circuit into an analog voltage of 0 to 3V, an adder 17 for producing the driving voltage of 0 to 15V by summation (superposition) of the alternating driving voltage and the direct-current driving voltage with a ratio of 1:4, and a power amplifier 18 for current amplification of output of the adder 17. The driving voltage amplified by the power amplifier 18 is applied to the piezoelectric element 11 of the actuator 6. In this configuration, the driving voltage applied to the piezoelectric element 11 can be defined as a result of the superposition of the direct-current driving voltage of 0 to 12V and the alternating driving voltage with a pulse height of 3V.

Figure 4:
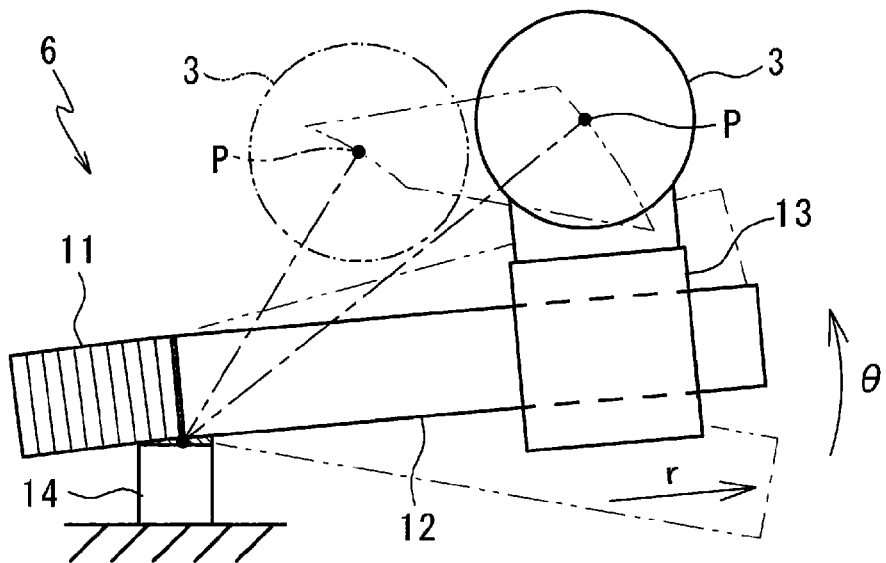
FIG. 4 is a view of the actuator of FIG. 2 in a state where positioning of the actuator has been attained.

The direct-current driving voltage component of the driving voltage determines an angle θ of inclination of the driving shaft 12, as shown in FIG. 4, caused by distorted expansion and contraction of the piezoelectric element 11, that is, an argument of a position of the movable member 13 in a polar coordinate system having a pole on a center of the inclination of the driving shaft 12. The alternating driving voltage component of the driving voltage causes asymmetrical expansion and contraction of the driving shaft 12 in an axial direction and slide displacement of the movable member 13 with respect to the driving shaft 12 by a distance proportional to a number of the pulses. Thus a moving radius r of the movable member 13 in the polar coordinate system is determined.

The alternating driving voltage component for the driving shaft 12 with the duty ratio of 0.7 makes the movable member 13 go away from the piezoelectric element 11, while the alternating driving voltage component with the duty ratio of 0.3 makes the movable member 13 displace so as to near the piezoelectric element 11.

In this manner, the actuator 6 is capable of positioning the movable member 13 in the polar coordinate system in accordance with the driving voltage obtained from the superposition of the direct-current driving voltage and the alternating driving voltage, and thereby attaining two-dimensional positioning of the alignment lens 3.

Figure 5:
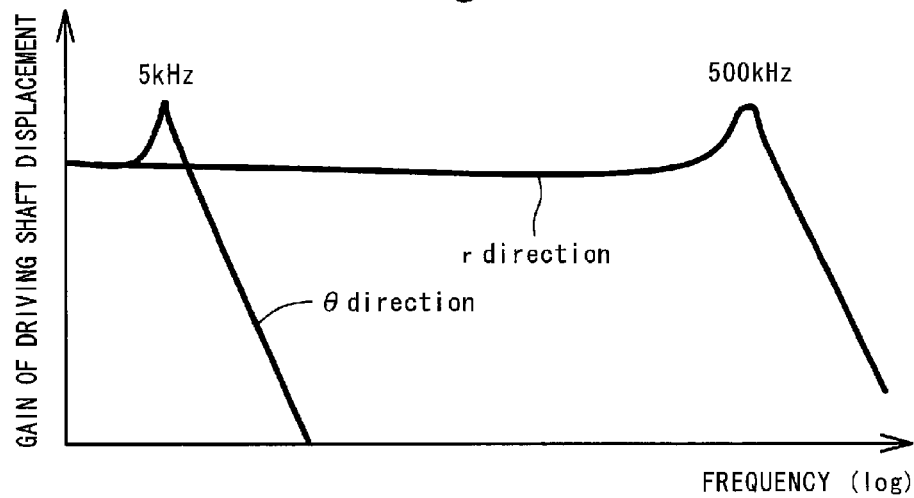
FIG. 5 is a diagram showing frequency characteristics of displacement of a driving shaft of the actuator of FIG. 2.

FIG. 5 shows frequency characteristics of amount of displacement of the actuator 6 in the directions r and e with respect to the driving voltage. As shown in the drawing, the frequency characteristic in the direction r is maximized with resonance in about 500 kHz and the frequency characteristic in the direction θ is maximized with resonance in about 5 kHz.

In the actuator 6 of the embodiment, as in conventional vibration type linear actuators, efficient slide displacement of the movable member 13 with respect to the driving shaft 12 can be attained by application to the piezoelectric element 11 of the rectangular wave voltage having a frequency about 0.7 time that maximizing the displacement of the driving shaft 12. Therefore, a frequency of the alternating driving voltage in the actuator 6 is set to be about 350 kHz. As shown in FIG. 5, the frequency of the alternating driving voltage is in a frequency range that prevents oscillation of the driving shaft 12 in the direction θ.

In the actuator 6, on the other hand, the direct-current driving voltage is set so as to produce a desired argument of the driving shaft 12. When a target value thereof is desired to be changed, it is performed so that a changed waveform is composed of a frequency in which the driving shaft 12 exhibits a high degree of response, that is, a low frequency component that ensures a sufficient gain in the direction θ in the frequency response. For instance, the direct-current driving voltage is changed in a rate of 1V/sec that corresponds to a maximal value of rate of change in voltage of a sine wave having a voltage of 3V and a frequency of 1 kHz.

Thus a resonance point of the driving shaft 12 in the direction θ is sufficiently higher than a range in which a gain in the direction e can be obtained and, therefore, setting of the rate of change in the direct-current driving voltage in the range in which the driving shaft 12 exhibits a high degree of response in the direction θ prevents the drive of the driving shaft 12 in the direction θ from causing resonance and vibrations in the direction r. That is, there is no interference between the driving of the actuator 6 in the direction r and the driving of the actuator 6 in the direction θ because they differ in frequency band.

Figure 6:
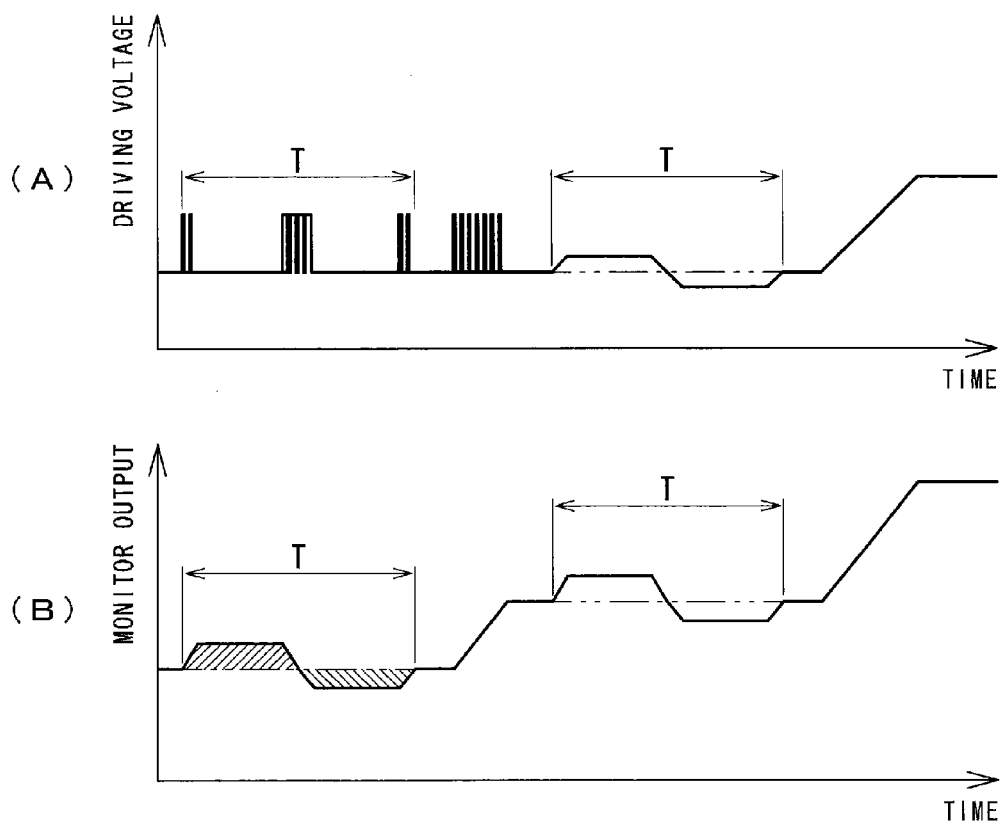
FIGS. 6 are diagrams showing change in driving voltage and change in monitor output in alignment of the optical device of FIG. 1.

FIG. 6 shows change in the driving voltage in the alignment of the laser beam in the laser module 1 as (A) and FIG. 6 shows resultant change in output of the power monitor 9 as (B). In the laser module 1, the driving circuit 7 applies two pulses of the alternating driving voltage for advancing the movable member 13, four pulses of the alternating driving voltage, 5 msec later, for making the movable member 13 retreat, and two pulses of the alternating driving voltage, further 5 msec later, for advancing the movable member 13, which pulses are superposed on the direct-current driving voltage keeping the present argument of the movable member 13 (and the alignment lens 3), so as to perform wobbling for moving the movable member only forward and backward by only a minute quantity in 10 msec (time period T). The movable member 13 moves by about 60 nm per one pulse of the alternating driving voltage.

Figure 7:
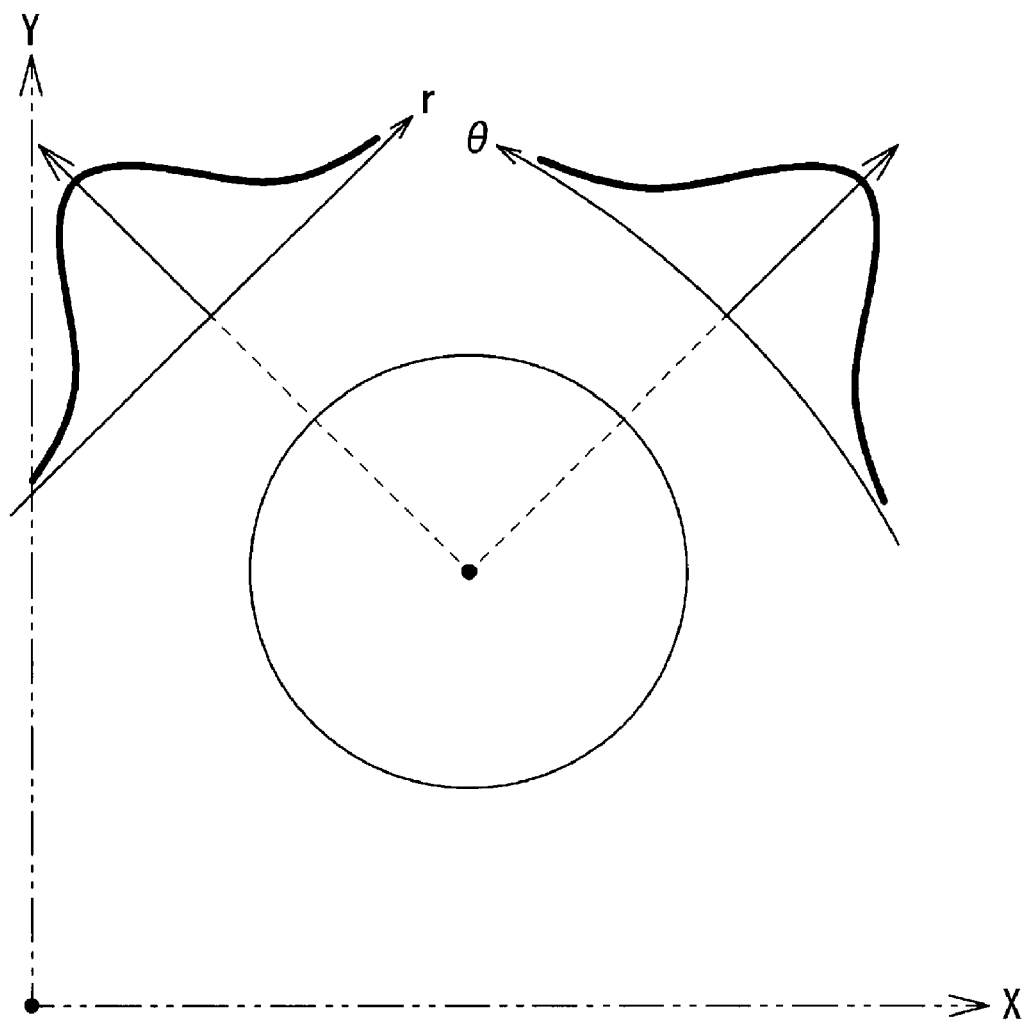
FIG. 7 is a diagram showing profiles of monitor output corresponding to decentering of a lens of FIG. 1.

As shown in FIG. 7, the output of the power monitor 9 decreases while drawing Gaussian curve in accordance with amounts of decentering of the laser beam in the directions r and θ. The control circuit 10 monitors the output of the power monitor 9 during the wobbling, calculates a difference between the output with the movable member 13 advanced and the output with the movable member 13 made to retreat, and causes the driving circuit 7 to output the alternating driving voltage with a duty ratio and a number of pulses which cause movement of the movable member 13 by a quantity proportional to the difference between the outputs. In the laser module 1, the optical axis of the laser beam focused by the alignment lens 3 is thereby aligned with the center of the second harmonic generator 4, so that the output of the power monitor 9 can be maximized.

In the laser module 1, as shown in FIG. 6, wobbling in the direction θ is performed subsequent to the drive for the alignment of the movable member 13 in the direction r based on the wobbling in the direction r, and a voltage value of the direct-current driving voltage is changed likewise on basis of a change in the output of the power monitor 9, so that adjustment of the argument of the driving shaft 12 and alignment of the movable member 13 in the direction θ are performed. For the wobbling in the direction θ, the control circuit 10 increases and decreases the direct-current driving voltage from the driving circuit by a predetermined voltage (for example 0.2V) which causes oscillation of the driving shaft 12 so as to move the movable member 13 by about 120 nm on condition where the movable member 13 is engaged at center (alignment position in design) of the driving shaft 12.

That is, the quantity of movement of the movable member 13 in the wobbling in the direction θ is generally equal to the quantity of movement of the movable member 13 in the wobbling in the direction r, in vicinity of the alignment position. A time period T for the wobbling for the increase and decrease in the direct-current voltage is set as long as the time period T (10 msec) for the wobbling in the direction r. Though depicted in the drawing so as to be long for clarification, time periods for the movement of the movable member 13 in the wobbling in both the directions are nearly negligible.

Thus the control device 10 is capable of calculating the difference between the outputs of the power monitor 9, in the wobbling, from a difference between areas of hatched regions in FIG. 6. Provided that the distances of movement and the time periods for the wobbling of the movable member 13 in the wobbling in the directions r and θ are set equal to each other as described above, the control device 10 is capable of calculating the quantities of decentering in both the directions by using the same computation.

Figure 8:
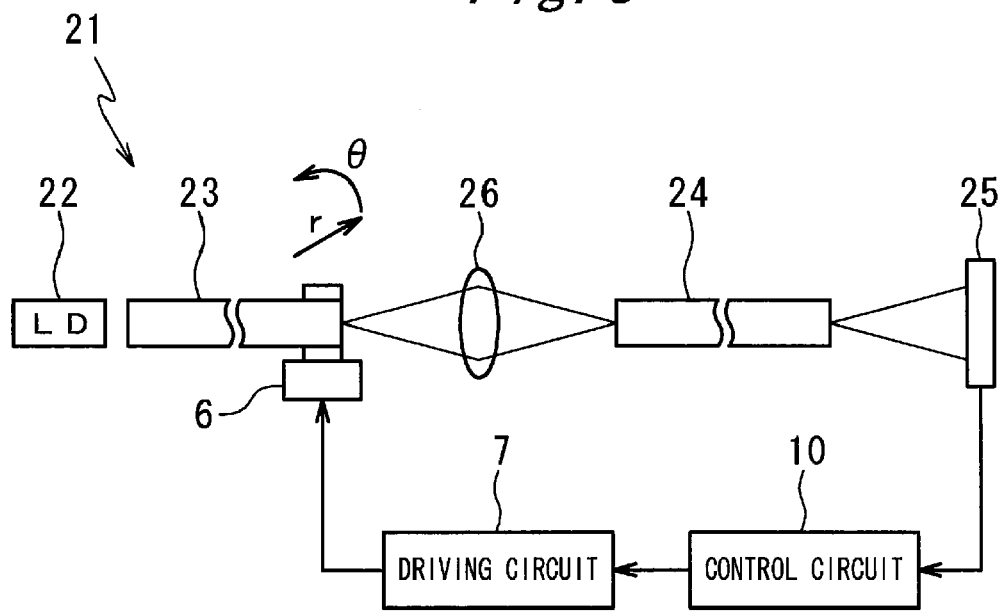
FIG. 8 is a schematic configuration of an optical device of a second embodiment of the invention.

FIG. 8 shows a laser module 21 as an optical device of a second embodiment of the invention. In a description of the embodiment, the same components as those of the first embodiment are designated by the same reference numerals and duplicate description is omitted.

The laser module 21 guides an output beam of a laser diode 22 through a first optical fiber (optical member) 23 and a second optical fiber 24 and casts the beam on a photodiode 25. The laser module 21 has a lens 26 for focusing the laser beam emitted from the first optical fiber 23 and making the beam incident on the second optical fiber 24.

An emission end of the first optical fiber 23 is positioned in a two-dimensional manner in a plane orthogonal to an optical axis of the laser beam by an actuator 6 capable of effecting drive in a polar coordinate system as in the first embodiment. A driving circuit 7 for applying a driving voltage to the actuator 6 is controlled by a control circuit 10 in accordance with output of the photodiode 25.

In the laser module 21, as in the first embodiment, the laser beam can be aligned in a two-dimensional manner by the one actuator 6. In the optical devices of the invention, as indicated by the embodiment, any optical member, other than the lens, may be driven by the actuator for the polar coordinate system.

Figure 9:
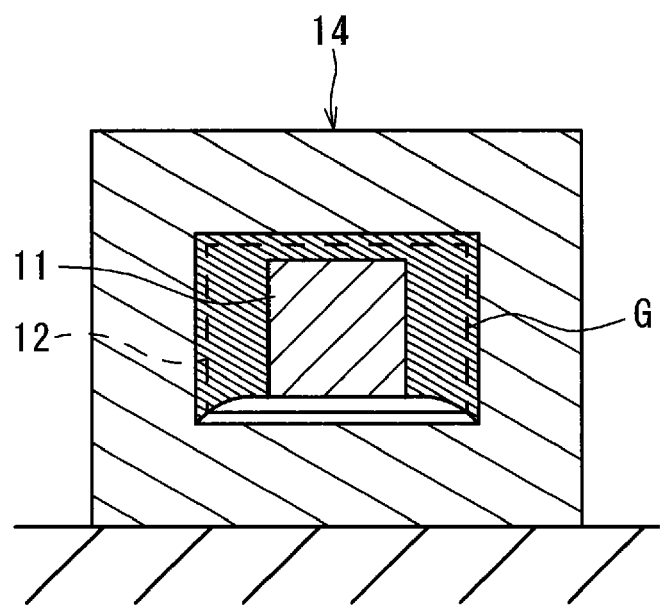
FIG. 9 is a cross-section showing an alternative configuration of an actuator of FIG. 2.

In the actuator 6 in accordance with the embodiments of the invention, the restraint member 14 for partially restraining the piezoelectric element 11 and the driving shaft 12 may fully surround the piezoelectric element 11 and the driving shaft 12 with a top side and lateral sides thereof fixed by adhesive G and with a bottom side thereof not fixed, as shown in FIG. 9. In the configuration, a direction of oscillation of the driving shaft 12 is opposite to that in the first embodiment.

In this example, the restraint member 14 also restrains side surfaces of the piezoelectric element 11. That is, the restraint member of the actuator for the polar coordinate system in accordance with the invention has only to asymmetrically restrain the expansion and contraction of the piezoelectric element with respect to an axis in a direction of the expansion and contraction of the piezoelectric element and, for instance, may be bonded so as to restrain a lateral side of the element up to middle thereof.

Although the present invention has been fully described in connection with the preferred embodiment thereof with reference to the accompanying drawings, it is to be noted that various changes and modifications are apparent to those skilled in the art. Such changes and modifications are to be understood as included within the scope of the present invention as defined by the appended claims unless they depart therefrom.

For instance, shapes of cross-sections of the piezoelectric element, the restraint member, the driving shaft and the like are not limited to rectangles by the illustrative embodiment but may be circular or other shapes.

The invention claimed is:

1. An actuator comprising:
an electromechanical transducer configured to cause mechanical displacement in accordance with a voltage applied thereto;
a driving shaft which is axially displaced and inclined, respectively, by the mechanical displacement of the electromechanical transducer;
a movable member configured to frictionally engage the driving shaft; and
a driving circuit configured to superimpose
  (a) an alternating driving voltage configured to cause axial vibrations of the driving shaft so as to cause sliding displacement of the movable member relative to the driving shaft, and
  (b) a direct-current variable driving voltage configured to cause an inclination of the driving shaft at a desired angle, the variable driving voltage having a low rate of change so as to prevent the sliding displacement of the movable member relative to the driving shaft, and
the driving circuit configured to apply the superposed voltages to the electromechanical transducer.

2. The actuator as claimed in claim 1, wherein the electromechanical transducer is a piezoelectric element, and the actuator further comprises a restraint member for partially restraining dimensional displacement of the piezoelectric element.

3. The actuator as claimed in claim 1, wherein the electromechanical transducer is a piezoelectric element, and wherein dimensional displacement of the piezoelectric element is partially restrained by bonding of a part of a side surface of the piezoelectric element.

4. An optical device wherein an optical member mounted on the movable member is positioned by the actuator as claimed in claim 1 with respect to an argument and a moving radius in a polar coordinate system.

5. The optical device as claimed in claim 4, further comprising:
a power monitor having an output configured to decrease in accordance with quantities of decentering of the optical member;
a controller configured to control driving of the actuator so as to maximize the output of the power monitor on basis of a change in the output of the power monitor caused by wobbling, wherein a moving radius and an argument of the movable member are alternately driven forward and backward by a minute quantity; and
wherein a time period for the wobbling for the moving radius is equal to a time period for the wobbling for the argument.

6. An optical device comprising:
one moving member capable of altering a moving radius and an argument in a polar coordinate system; and
an optical member positioned by the moving member;
wherein an argument position of the moving member is altered by applying a direct-current driving voltage to an electromechanical transducer, and a moving radius position of the movie member is altered by applying an alternating driving voltage to the electromechanical transducer.

7. The optical device as claimed in claim 6, further comprising a driving shaft which is axially vibrated by the electromechanical transducer, wherein the moving member is engaged on the driving shaft and configured to be slidingly displaced relative to the driving shaft.

8. The optical device as claimed in claim 6, further comprising:
a power monitor having an output configured to decrease in accordance with quantities of decentering of the optical member; and
a controller configured to drive the electromechanical transducer so as to maximize the output of the power monitor on basis of a change in the output of the power monitor caused by wobbling;
wherein the moving radius and argument of the electromechanical transducer are alternately driven forward and backward by a minute quantity, and wherein a time period for the wobbling for the moving radius is equal to a time period for the wobbling for the argument.

* * * * *

UNITED STATES PATENT AND TRADEMARK OFFICE
CERTIFICATE OF CORRECTION

PATENT NO. : 8,320,063 B2
APPLICATION NO. : 12/763502
DATED : November 27, 2012
INVENTOR(S) : Kazuhiro Shibatani Page 1 of 1

It is certified that error appears in the above-identified patent and that said Letters Patent is hereby corrected as shown below:

In the Claims

In column 8, claim 6, line 17, before "member is altered by applying" replace "movie" with --moving--.

Signed and Sealed this
Thirtieth Day of July, 2013

Teresa Stanek Rea
*Acting Director of the United States Patent and Trademark Office*